(12) United States Patent
Bodenchuk et al.

(10) Patent No.: US 12,543,774 B2
(45) Date of Patent: Feb. 10, 2026

(54) DEVICE AND METHOD FOR GRINDING HERBS AND TOBACCO

(71) Applicant: Lifted Limited, LLC, Boulder, CO (US)

(72) Inventors: Matthew Robert Bodenchuk, Boulder, CO (US); Leslie Renea Bodenchuk, Boulder, CO (US)

(73) Assignee: Lifted Limited, LLC, Boulder, CO (US)

( * ) Notice: Subject to any disclaimer, the term of this patent is extended or adjusted under 35 U.S.C. 154(b) by 299 days.

(21) Appl. No.: 18/141,087

(22) Filed: Apr. 28, 2023

(65) Prior Publication Data

US 2023/0345994 A1 Nov. 2, 2023

Related U.S. Application Data

(60) Provisional application No. 63/335,992, filed on Apr. 28, 2022.

(51) Int. Cl.
| | |
|---|---|
| *A24B 7/04* | (2006.01) |
| *A47J 42/24* | (2006.01) |
| *A47J 42/28* | (2006.01) |
| *A47J 42/40* | (2006.01) |

(52) U.S. Cl.
CPC ................ *A24B 7/04* (2013.01); *A47J 42/24* (2013.01); *A47J 42/28* (2013.01); *A47J 42/40* (2013.01)

(58) Field of Classification Search
CPC . A47J 42/28; A47J 42/24; A47J 42/38; A24B 7/04; B02C 19/22
See application file for complete search history.

(56) References Cited

U.S. PATENT DOCUMENTS

| | | | |
|---|---|---|---|
| 4,304,363 | A | 12/1981 | Atkielski |
| 8,393,563 | B2 | 3/2013 | Chaoui et al. |
| 9,895,698 | B2 | 2/2018 | Spielman |
| 10,966,571 | B1 | 4/2021 | Barrett et al. |
| 2014/0252149 | A1* | 9/2014 | Ding ........................ A47J 42/24 241/89.4 |
| 2017/0135525 | A1* | 5/2017 | Bougerol ................ A47J 42/50 |

(Continued)

OTHER PUBLICATIONS

"Otto Grinders," Banana Bros, from Nov. 23, 2021, 2 pages [retrieved online Dec. 8, 2023 from: bananabros.com/collections/otto].

(Continued)

*Primary Examiner* — Mohammed S. Alawadi
(74) *Attorney, Agent, or Firm* — Sheridan Ross P.C.

(57) ABSTRACT

A grinder is provided that generally comprises a rotor that is at least partially disposed within a housing. Materials such as tobacco, herb, spices, or food is loaded into the housing, and a user turns the rotor relative to the housing to drive protrusions such as blades extending from a shaft of the rotor into the tobacco, herb, spices, or food. This grinds the contents into smaller pieces. A funnel portion at a lower end of the grinder can dispense the smaller, ground pieces for subsequent use. Some embodiments of the grinder include a rotatable sleeve to selectively open and close access to the housing of the grinder. Various embodiments of the grinder include a divider and an auger to allow only sufficiently ground pieces of contents to be dispensed from the grinder.

14 Claims, 8 Drawing Sheets

(56) References Cited

U.S. PATENT DOCUMENTS

2018/0103805 A1    4/2018  Huang
2018/0199759 A1    7/2018  Qiu
2018/0271328 A1    9/2018  Petrossian

OTHER PUBLICATIONS

"Catalog," Twistyshop, 2022, 12 pages [retrieved online Dec. 8, 2023 from: web.archive.org/web/20220331061508/https://twisty.shop/collections/catalog].

* cited by examiner

DEVICE AND METHOD FOR GRINDING HERBS AND TOBACCO

CROSS-REFERENCE TO RELATED APPLICATIONS

This application claims priority under 35 U.S.C. § 119(e) to U.S. Provisional Patent Application Ser. No. 63/335,992 filed Apr. 28, 2022, which is incorporated herein in its entirety by reference.

FIELD OF THE INVENTION

Embodiments of the present invention generally relate to a grinder for grinding herbs, tobacco, and other materials. More specifically, the grinder is manual and portable and can be used to grind herbs, tobacco, spices, food, and other materials while on the go.

BACKGROUND OF THE INVENTION

Although tobacco products have been produced and sold as pre-manufactured products (such as pre-made cigarettes and cigars) by commercial enterprises for more than 100 years, there remains a demand in the art for handmade or custom-made tobacco and related products. Additionally, some people prefer smoking tobacco or other materials out of a pipe.

For example, many smokers or consumers of smokeable products believe that "roll-your-own" tobacco or smoking products, including pipes, are not as harmful to human health as commercially sold smoking products. This is, in part, because a person hand rolling a smokeable product, such as a cigarette or cigar, can control the specific content of the product and therefore potentially eliminate, or at least limit, undesirable chemicals in the custom "rolling" process. The same is true for packing a pipe.

In addition to the above reasons, there is also sometimes a social factor which lends to the desirability of hand or custom rolling smokeable products or pipes. For example, "hookah" smoking has become popular in recent years with restaurants sometimes including hookah bar or smoking areas. Entire lounges devoted to hookah smoking have also emerged on the social scene.

Furthermore, it may be desirable to add or substitute smokeable substances, in custom rolled smoking products, to obtain custom, smokeable "cigarettes" which contain smokable matter not otherwise readily available in pre-manufactured cigarette products. For example, custom rolling of cigarette type products which contain flavored tobacco(s), cloves, mixtures of tobaccos, or even cannabis (where legal, or for legal, medical purposes) is possible.

Producing a rolled up cigar or cigarette or smoking a pipe requires tobacco that has been ground into very small pieces from a dried tobacco leaf. The ground tobacco is rolled into a cigar or cigarette using rolling paper so that the user may smoke it. The ground tobacco is also suitable to be smoked with a conventional smoking pipe. Before the 1900s, dried tobacco leaves were commonly ground down by means of the palm of the hand and fingers until the pieces were small enough to be used in a cigar or cigarette. In the early 1900s, innovative devices were developed to grind tobacco and other smoking materials.

A tobacco grinder is a tool for grinding dry tobacco leaves into small pieces. Generally, after the tobacco leaves are ground by the tobacco grinder, it is necessary to use your hand or other tools to take the ground tobacco leaves out of the grinder and put them into rolling papers or fill them into a smoke pan of an electronic cigarette or the bowl of a pipe for use. There can be spillage and waste when taking out the ground tobacco from the grinder.

Today, the most widely used tobacco grinder design is one with three cavities, a top cap, and a bottom cap. The top half of the first cavity is formed by the top cap. A plurality of grinding knives (also called blades or teeth) protrudes from the top cap. The bottom half of the first cavity also has a plurality of grinding knives and several large holes that lead into the second cavity. The second cavity has a screen that leads into the third cavity. The bottom half of the third cavity is formed by the bottom cap of the grinder.

A dried tobacco leaf is placed inside the first cavity. The top cap is then rotated relative to the rest of the grinder allowing the grinding knives to cut the tobacco into smaller pieces. The smaller tobacco pieces are then passed through the large holes into the second cavity and then through the screen into the third cavity. The pieces in the second cavity can then be directed back to the first cavity for further grinding. The ground tobacco in the third cavity is collected in the bottom cap which is removed by the user when ready to smoke it.

Some tobacco grinders are electric and either use batteries (chargeable or replaceable) or plug into an outlet. Other grinders are manual, where a portion of the grinder is rotated by the user.

SUMMARY OF THE INVENTION

There are many drawbacks with tobacco grinders currently sold on the market. For example, ground material can remain in various portions of the grinder and can be difficult to remove. There is mess associated with scooping or pouring out ground tobacco from the grinder. Electric grinders are expensive, large, heavy, and need power, i.e., batteries or plugs. Electric grinders also have additional pieces and parts that can break or malfunction. Electric grinders can be difficult to clean since the electronic components cannot get wet.

Note that the grinder described herein can be used for herbs, tobacco, spices, food, etc., but is simply called a "grinder" herein. The "contents" put into the grinder and ground by the grinder can be herb, tobacco, spices, food, and other products typically ground by a user prior to use of the product.

These and other needs are addressed by the various embodiments and configurations of the present invention. This invention relates to a novel system, device, and methods for providing a portable manual herbs, tobacco, spices, and food grinder. The novel grinder provided herein is small enough to fit in a user's pocket and does not require any power or batteries.

Thus, it is one aspect of various embodiments of the present invention to provide a small grinder that is portable and can be easily transported in a user's bag or pocket without spilling, making a mess, or breaking.

It is another aspect of various embodiments of the present invention to provide a grinder that is operated manually such that no electronic components are necessary. One advantage of some embodiments is that the grinder has minimal parts, which means there are fewer parts to break and/or cause a malfunction. Thus, the grinder is more reliable than prior art tobacco and herb grinders and current and prior art electric grinders.

It is one aspect of various embodiments of the present invention to provide a grinder with a funnel-shaped exit portion to enable a user to cleanly pour the contents into a pipe, rolling papers, electronic cigarette, or other smoking utensil. In some embodiments, the grinder includes an auger to push the ground tobacco, herb, or other contents out of the grinder and out of the funnel in further embodiments.

In some embodiments, the grinder has protrusions such as teeth or blades attached to the central shaft. Note that the terms teeth, knives, and blades can be used interchangeably herein. In other embodiments, the grinder has helical or spiral shaped blades positioned around the central shaft. In further embodiments, the spiral shaped blades have three radial arms extending from the shaft, similar to a triskelion or triskeles. Additionally, the spiral shaped blades may have jagged teeth on all or a portion of the perimeter of the blades. These jagged teeth grind the tobacco, herb, or other contents in the grinder as they are rotated around the shaft or as the housing surrounding the shaft and blades is rotated. Thus, in some embodiments, the blades rotate due to being fixed to the shaft and the shaft rotating and in other embodiments the housing surrounding the shaft and blades rotates. Further, the housing can include protrusions such as teeth or blades that further grind the contents in conjunction with the blades or teeth connected to the shaft.

A first aspect of the present disclosure is to provide a grinder, comprising a housing having an upper portion, a body portion, and a funnel portion, wherein the upper portion has a top opening and a side opening that provide access to an interior space of the housing, and the side opening of the upper portion is configured to receive material; and wherein the funnel portion tapers inwardly from the body portion to a lower end with a bottom opening; a plurality of first protrusions extending from an inner surface of the housing; a rotor having a shaft extending from a knob, wherein the rotor is configured to be inserted through the top opening of the upper portion of the housing such that the shaft of the rotor is at least partially positioned in the interior space of the housing; and a plurality of second protrusions extending from an outer surface of the shaft of the rotor, wherein the rotor is configured to rotate relative to the housing such that the pluralities of first and second protrusions grind the material into smaller pieces.

The grinder of the first aspect may include, optionally, that the housing is oriented along an axis, and each first protrusion has an angular position about the axis that is offset from an angular position of an adjacent first protrusion.

The grinder of the first aspect may include one or more of the previous embodiments and, optionally, that the angular position of each first protrusion is offset by 90 degrees from the angular position of the adjacent first protrusion.

The grinder of the first aspect may include one or more of the previous embodiments and, optionally, that the plurality of first protrusions are blades, and each first protrusion has a different blade orientation relative to an adjacent first protrusion.

The grinder of the first aspect may include one or more of the previous embodiments and, optionally, that a second protrusion of the plurality of second protrusion is configured to pass between adjacent first protrusions of the plurality of first protrusion as the rotor rotates relative to the housing.

The grinder of the first aspect may include one or more of the previous embodiments and, optionally, a sleeve configured to be positioned about the upper portion of the housing and configured to selectively open and close the side opening of the upper portion.

The grinder of the first aspect may include one or more of the previous embodiments and, optionally, that the sleeve comprises a side opening, and the sleeve is configured to be rotatable about the upper portion to selectively align the side opening of the sleeve with the side opening of the upper portion, which selectively opens the side opening of the upper portion.

A second aspect of the present disclosure is to provide a grinder, comprising a housing having a body portion with a top opening and having a funnel portion that tapers from the body portion to a lower end opposite the top opening, the lower end having a bottom opening, wherein the housing has an interior space between the top and bottom openings that is configured to receive a material; a rotor having a shaft extending from a knob, wherein a plurality of blades extends from the shaft of the rotor; and a divider positioned between the plurality of blades and the bottom opening of the funnel portion of the housing, the divider having an aperture, wherein the rotor is configured to rotate relative to the housing such that the plurality of blades grinds the material into smaller pieces to pass through the aperture of the divider and out of the bottom opening.

The grinder of the second aspect may include, optionally, that the plurality of blades comprises a first blade oriented at a first angle relative to an axis of the shaft; and a second blade oriented at a second angle relative to the axis of the shaft, wherein the first and second angles are distinct.

The grinder of the second aspect may include one or more of the previous embodiments and, optionally, that a blade of the plurality of blades comprises three arms evenly arrayed about an axis of the shaft.

The grinder of the second aspect may include one or more of the previous embodiments and, optionally, that each arm comprises a plurality of teeth.

The grinder of the second aspect may include one or more of the previous embodiments and, optionally, an auger having a shaft operably engaged with the shaft of the rotor, the auger having at least one blade twisting about the shaft of the auger, wherein the auger is configured to rotate with the rotor such that the at least one blade transfers smaller pieces of material from the divider to the bottom opening.

The grinder of the second aspect may include one or more of the previous embodiments and, optionally, that the at least one blade is two blades symmetrically arranged about the shaft of the auger.

The grinder of the second aspect may include one or more of the previous embodiments and, optionally, a projection extending from an outer edge of the divider that is configured to engage an inner surface of the housing such that the divider is configured to remain stationary as the rotor rotates.

A third aspect of the present disclosure is to provide a handheld grinder, comprising a housing having a cylindrical body portion, a top end, and a funnel portion opposite the top end and connected to the cylindrical body portion, wherein the funnel portion tapers inwardly from the body portion to a lower end with a bottom opening, wherein the housing has an interior space between the top end and the bottom opening that is configured to receive a material; and a rotor having a shaft extending into the interior space of the housing and having a plurality of blades extending from the shaft, wherein the shaft is configured to rotate relative to the housing, and wherein a longitudinal axis of the rotor shaft is aligned with a longitudinal axis of the housing, wherein the handheld grinder is sized to fit into a user's pocket.

The handheld grinder of the third aspect may include, optionally, that wherein the handheld grinder does not comprise electrical components.

The handheld grinder of the third aspect may include one or more of the previous embodiments and, optionally, an auger having a shaft operably engaged with the shaft of the rotor, the auger having at least one blade twisting about the shaft of the auger, wherein the rotor is configured to rotate relative to the housing such that the plurality of blades grind the material into smaller pieces.

The handheld grinder of the third aspect may include one or more of the previous embodiments and, optionally, that the auger is configured to rotate with the rotor such that the at least one blade transfers smaller pieces of material out of the bottom opening.

The handheld grinder of the third aspect may include one or more of the previous embodiments and, optionally, that the auger is configured to rotate independently of the rotor such that the at least one blade transfers smaller pieces of material out of the bottom opening.

The handheld grinder of the third aspect may include one or more of the previous embodiments and, optionally, a divider spanning the interior space of the housing and positioned between the plurality of blades and the auger, wherein the divider comprises an aperture configured to allow only sufficiently small material to pass through the divider to the auger.

A fourth aspect of the present disclosure is to provide a grinder, comprising a housing having a body portion with a top opening and having a funnel portion that tapers from the body portion to a lower end with a bottom opening, wherein the housing has an interior space between the top and bottom openings that is configured to receive a material; a rotor having a shaft extending from a knob, wherein a plurality of blades extends from the shaft of the rotor; and an auger having a shaft operably engaged with the shaft of the rotor, the auger having at least one blade twisting about the shaft of the auger, wherein the rotor is configured to rotate relative to the housing such that the plurality of blades grind the material into smaller pieces, and wherein the auger is configured to rotate with the rotor such that the at least one blade transfers smaller pieces of material out of the bottom opening.

The grinder of the fourth aspect may include, optionally, a divider spanning the interior space of the housing and positioned between the plurality of blades and the auger, wherein the divider comprises an aperture configured to allow only sufficiently small material to pass through the divider to the auger.

The grinder of the fourth aspect may include one or more of the previous embodiments and, optionally, a first blade oriented at a first angle relative to an axis of the shaft of the rotor; and a second blade oriented at a second angle relative to the axis of the shaft of the rotor, wherein the first and second angles are distinct.

The grinder of the fourth aspect may include one or more of the previous embodiments and, optionally, that the first blade and the second blade are separated by a spacer disposed about the shaft of the rotor.

The grinder of the fourth aspect may include one or more of the previous embodiments and, optionally, that a blade of the plurality of blades comprises three arms evenly arrayed about an axis of the shaft.

The grinder of the fourth aspect may include one or more of the previous embodiments and, optionally, that each arm comprises a plurality of teeth.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification and claims are to be understood as being modified in all instances by the term "about".

The term "a" or "an" entity, as used herein, refers to one or more of that entity. As such, the terms "a" (or "an"), "one or more," and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. § 112(f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

These and other advantages will be apparent from the disclosure of the invention(s) contained herein. The above-described embodiments, objectives, and configurations are neither complete nor exhaustive. The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

BRIEF DESCRIPTION OF THE DRAWINGS

Those of skill in the art will recognize that the following description is merely illustrative of the principles of the disclosure, which may be applied in various ways to provide many different alternative embodiments. This description is made for illustrating the general principles of the teachings of this disclosure and is not meant to limit the inventive concepts disclosed herein.

The accompanying drawings, which are incorporated in and constitute a part of the specification, illustrate embodiments and together with the general description of the invention given above and the detailed description of the drawings given below, serve to explain the principles of the invention.

It should be understood that the drawings are not necessarily to scale, and various dimensions may be altered. In certain instances, details that are not necessary for an understanding of the invention or that render other details difficult to perceive may have been omitted. It should be understood, of course, that the invention is not necessarily limited to the particular embodiments illustrated herein.

2 Housing
4 Upper Portion
6 Body Portion
8 Funnel Portion
10 Axis (Housing)
12 Top Opening (Housing)
14 Side Opening (Housing)
16 Rib (Housing)
18 Bottom Opening
20 Rotor
22 Axis (Rotor)
24 Knob
26 Rib (Knob)
28 Shaft (Rotor)
30 Blade (Rotor)
31 Set of Blades (Rotor)
32 Blade (Housing)
34 Sleeve
36 Axis (Sleeve)
38 Top Opening (Sleeve)
40 Side Opening (Sleeve)
41 Grinder
42 Grinder
43 Rotor
44 Knob
45 Housing
46 Body
48 Funnel
50 Axis (Grinder)
52 Lower Opening
54 Shaft (Rotor)
56 First Blade
58 First Arm
59 Teeth (First Arm)
60 Second Blade
62 Second Arm
63 Teeth (Second Arm)
64 Divider
66 Aperture
68 Auger
70 Blade (Auger)
72 Shaft (Auger)
74 Notch (Shaft)
76 Notch (First Blade)
78 Spacer
80 Projection

DETAILED DESCRIPTION

Those of skill in the art will recognize that the following description is merely illustrative of the principles of the invention, which may be applied in various ways to provide many different alternative embodiments. This description is made for illustrating the general principles of the teachings of this invention and is not meant to limit the inventive concepts disclosed herein.

The accompanying drawings, which are incorporated in and constitute a part of the specification, illustrate embodiments of the invention and together with the general description of the invention given above and the detailed description of the drawings given below, serve to explain the principles of the invention.

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

The figures show various embodiments of the grinder in accordance with the present disclosure. Components and elements of one embodiment of the grinder can be utilized with another embodiment of the grinder and/or combined with components and elements from another embodiment of the grinder.

Figure 1A:
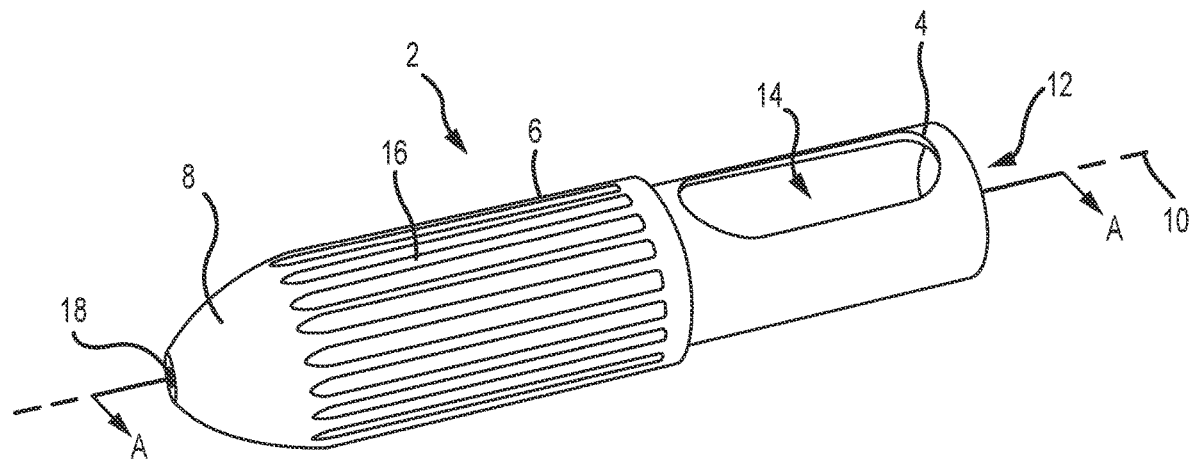
FIG. 1A is a perspective view of a housing of a grinder in accordance with an embodiment of the present disclosure.
Figure 1B:
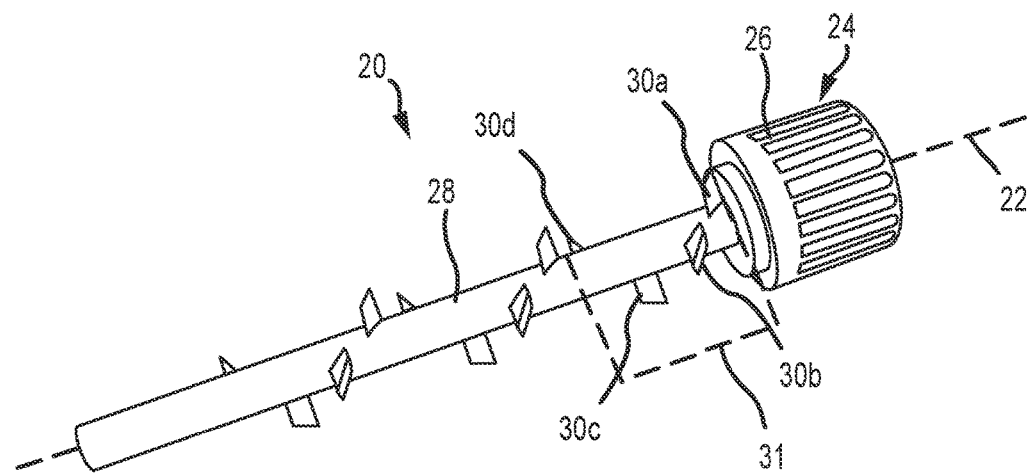
FIG. 1B is a perspective view of a rotor of a grinder in accordance with an embodiment of the present disclosure.

FIG. 1A is a perspective view of a housing 2 of a grinder (41 in FIG. 4), and FIG. 1B is a perspective view of a rotor 20 of the grinder. The housing 2 generally comprises an upper portion 4, a body portion 6, and a funnel portion 8 oriented along an axis 10. The upper portion 4 of the housing 2 has a top opening 12 and a side opening 14. The top opening 12 has a circular shape to receive the rotor 20, and the side opening 14 has an oval shape to receive material such as tobacco, herb, spices, food, etc. However, it will be appreciated that these openings 12, 14 can have any shape such as circular, oval, rectangular, square, triangular, etc.

The body portion 6 extends downwardly from the upper portion 4, and ribs 16 extend outwardly from the body portion 6. A user can grasp the ribs 16 of the housing 2 to rotate the housing 2 and rotor 20 relative to each other to operate the grinder. Other embodiments may have fewer or no raised ribs 16. The funnel portion 8 tapers from the body portion 6 to a bottom opening 18 where contents that has been ground to smaller pieces exits the grinder. The funnel portion 8 tapers inwardly from the body diameter to a smaller diameter at the end with the bottom opening 18.

Figure 4:
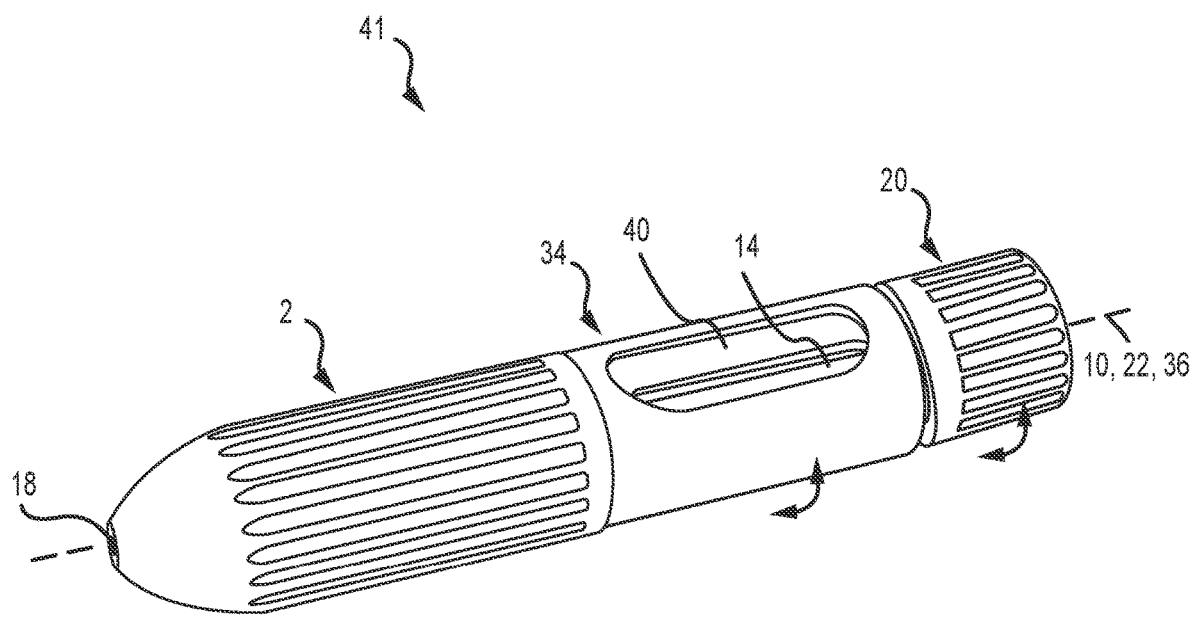
FIG. 4 is a perspective view of an assembled grinder in accordance with an embodiment of the present disclosure.

FIG. 1B is a perspective view of a rotor 20 that is insertable into the housing 2 through the top opening 12 to form part of the overall grinder (41 in FIG. 4). The rotor 20 comprises a knob 24 and a shaft 28 oriented along an axis 22. The knob 24 has optional raised ribs 26, which a user can grasp during operation of the grinder. The shaft 28 extends downwardly from the knob 24, and protrusions such as teeth or blades 30a-30d extend outwardly from the shaft 28. The blades 30a-30d can have a sharp edge or multiple sharp edges for grinding the tobacco, herb, or other contents. The blades 30a-30d are located at different positions along the length of the shaft 28 and around the shaft 28 at different angular positions. While embodiments herein are described with respect to blades, it will be appreciated that the present disclosure encompasses embodiments with protrusions that may not have a cutting edge or any edge at all.

As shown in FIG. 1B, a set 31 of four blades 30a-30d extends around the shaft 28. Each blade 30a-30d in the set 31 has a different orientation than the previous blade. Specifically, the first blade 30a tapers upwardly to a point, the second blade tapers downwardly to a point, etc. Each blade 30a-30d is also offset 90 degrees about the axis 22 from the previous blade. The blades in FIG. 1B repeat this pattern for three sets for a total of twelve blades. More or fewer blades 30 are possible in various embodiments included in the scope of the invention. Additionally, each set 31 of blades 30 can have more or fewer blades 30 in each set 31. It will be appreciated that the present disclosure encompasses embodiments where, for instance, successive blades have the same orientation or a different pattern of orientations. Moreover, it will be appreciated that the present disclosure encompasses embodiments where, for example, successive blades are offset 45 degrees about the axis 22 from the previous blade. In various embodiments, there is not necessarily a constant/consistent angular offset between adjacent blades.

Figure 2:
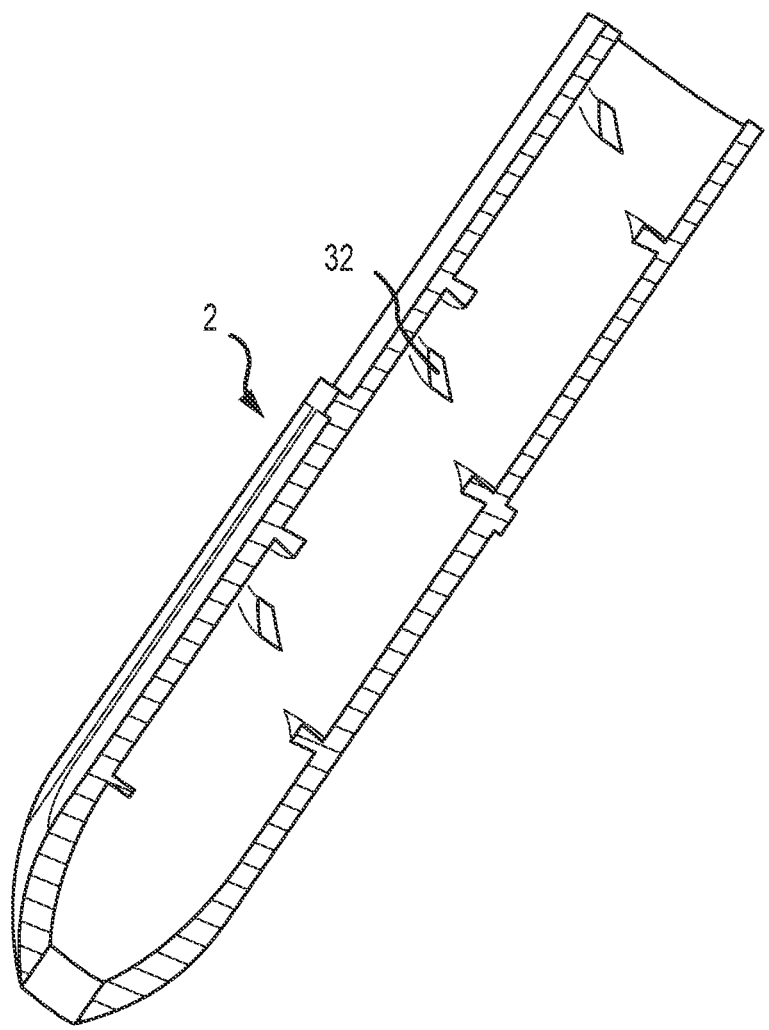
FIG. 2 is a cross-sectional, perspective view of a housing of a grinder taken along line A-A in FIG. 1A in accordance with an embodiment of the present disclosure.

FIG. 2 is a cross-sectional view of the housing 2 of the grinder taken along line A-A in FIG. 1A. Here, the housing 2 comprises further protrusions such as teeth or blades 32 that extend inwardly. As the user rotates the rotor (20 in FIG. 1B) and housing 2 relative to each other, the blades on the rotor (30a-30d in FIG. 1B) act in concert with the blades 32 on the housing 2 to grind the contents. Thus, in some embodiments, a given blade 32 on the housing 2 is configured to pass between adjacent blades on the rotor (30 in FIG. 1B), or at least proximate to one blade on the rotor. Moreover, the blades 32 on the housing 2 can be arranged in sets like the blades on the rotor (30 in FIG. 1B) where each blade 32 in the set has a different orientation than the previous blade and is also offset 90 degrees (if there are four blades in the set) about an axis from the previous blade. The blades in each set can be offset by more or less than 90 degrees if there are fewer or more blades, respectively, in each set and the blades are evenly spaced apart. In some embodiments, the blades in a set are not evenly spaced apart.

Figure 3:
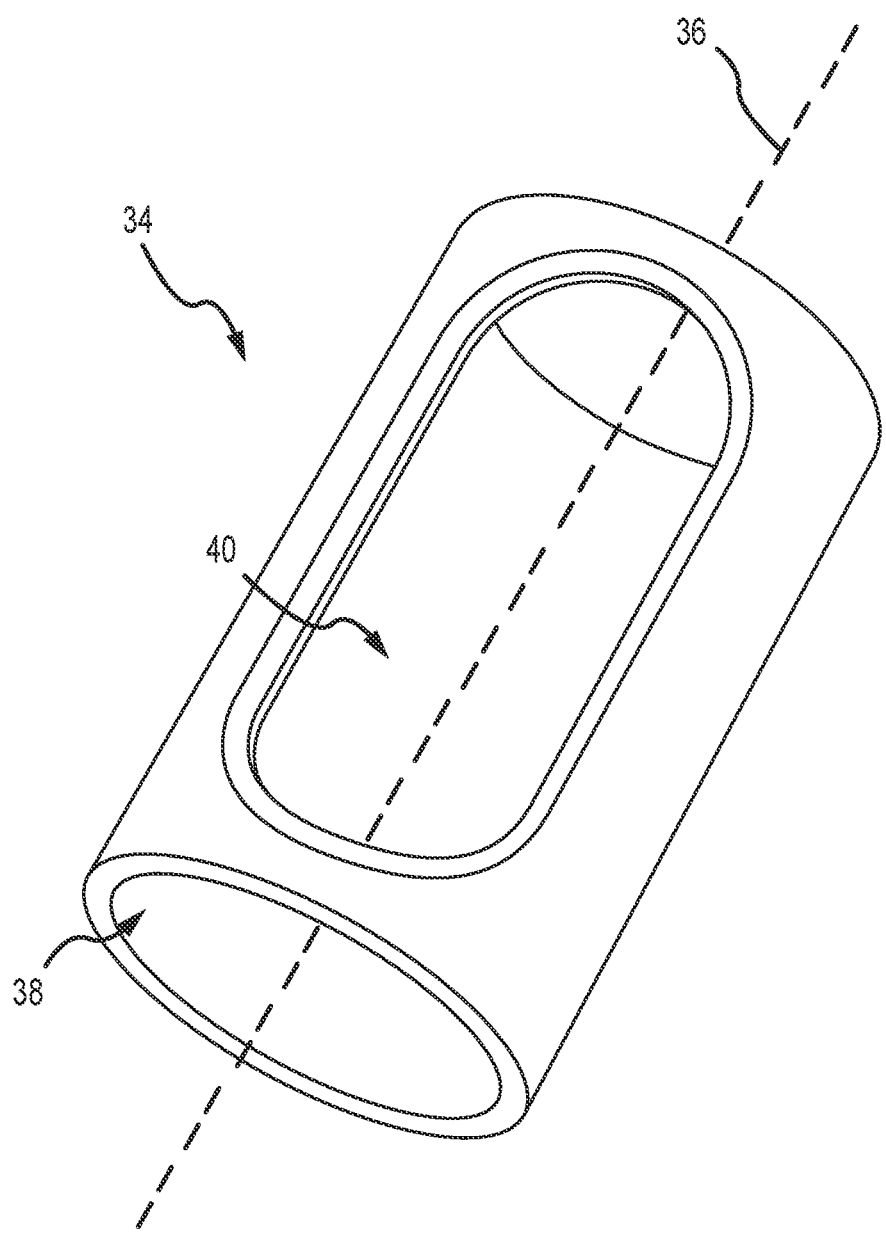
FIG. 3 is a perspective view of a sleeve of a grinder in accordance with an embodiment of the present disclosure.

FIG. 3 is a perspective view of a sleeve 34 that opens and closes access to the housing of the grinder. The sleeve 34 has a central aperture 38 extending through the sleeve 34 along an axis 36 and has a side opening 40. In some embodiments, the side opening 40 is perpendicular to the central aperture 38. The sleeve 34 has a cylindrical shape and is sized similar to the upper portion of the housing (4 in FIG. 1A) and is positionable around the upper portion such that the upper portion extends through the central aperture 38, and the axis 36 of the sleeve 34 is aligned with the axis of the housing (10 in FIG. 1A). Therefore, the outer diameter of the upper portion of the housing is smaller than the inner diameter of the sleeve 34. In some embodiments, the side opening 40 of the sleeve 34 has a similar shape and size as the side opening of the upper portion (14 in FIG. 1A). In other embodiments, the side opening 40 has a different shape and size than that shown in FIG. 3, but will typically have a similar shape and size as the side opening in the upper portion. The side opening 40 of the sleeve 34 can have a slightly smaller or slightly larger size as the side opening of the upper portion (14 in FIG. 1A). If the side opening 40 of the sleeve 34 is slightly smaller than the side opening 14 of the upper portion, then the grinder is easier to close and keep the contents therein. If the side opening 40 of the sleeve 34 is slightly larger than the side opening 14 of the upper portion, the it is easier to get the contents to be ground into the grinder. The sleeve 34 is rotatable around the upper portion of the housing such that the user can rotate the sleeve 34 until the two side openings 14, 40 align. The user can then put the contents into the aligned side openings 14, 40 and into the housing. Once the contents are loaded into the housing, the user can rotate the sleeve 34 to offset the side openings 14, 40 and close access to the housing of the grinder and to keep the contents within the housing of the grinder.

FIG. 4 is a perspective view of an assembled grinder 41 that has a housing 2, a sleeve 34, and a rotor 20 oriented along their respective axes 10, 22, 36, which are all aligned. The sleeve 34 is rotatable about these axes 10, 22, 36 to open and close the side opening 14 and access to the housing 2. As shown in FIG. 4, the sleeve 34 is between open and closed positions where the side opening 40 of the sleeve 34 is only partially aligned with the side opening 14 of the housing 2. As noted, during operation, these side openings 14, 40 can be aligned so that a user can load contents into the housing 2. Then a user can rotate the sleeve 34 so that the side openings 14, 40 are not aligned to close the side opening 14 of the housing 2 and confine the contents within the housing 2. Next, a user can twist the rotor 20 relative to the housing 2 to move the blades of the rotor and the blades of the housing relative to each other. The blades grind the contents into smaller pieces, which exit the bottom opening 18 of the housing.

In some embodiments, the grinder 41 of FIGS. 1-4 also has a divider 64, an auger 68, and/or a funnel 48 similar to those components shown in the grinder 42 embodiment of FIGS. 5-8.

Figure 5:
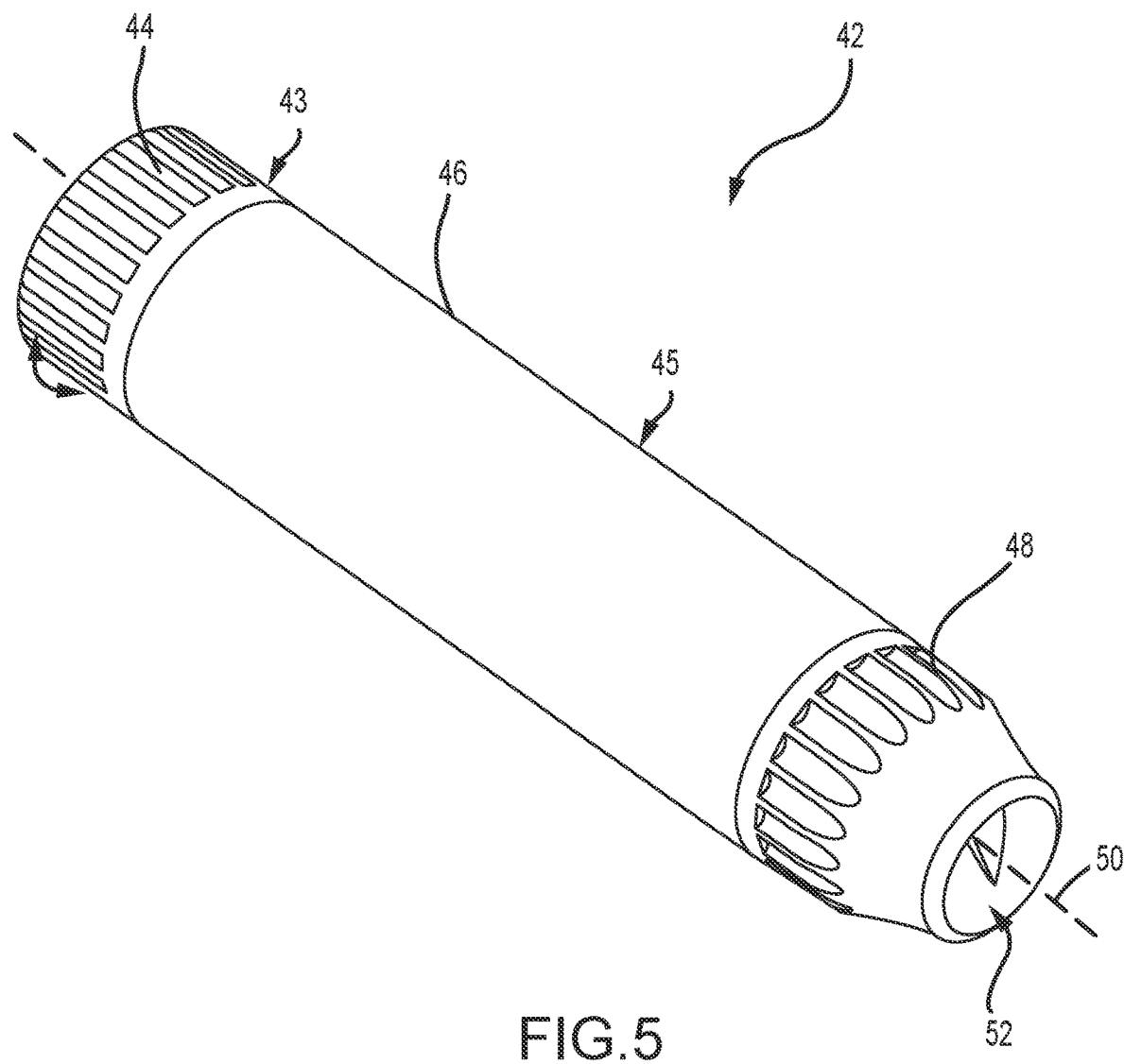
FIG. 5 is a perspective view of a grinder in accordance with an embodiment of the present disclosure.

FIG. 5 is a perspective view of another grinder 42 having a rotor 43 and a housing 45 oriented along an axis 50. The rotor 43 comprises a knob 44 and a shaft (54 in FIG. 6), and the housing comprises a body portion 46 and a funnel portion 48. When contents are ground to smaller pieces within the grinder 42, the smaller pieces exit out of a bottom opening 52 of the funnel 48. Both the outer surface of the funnel portion 48 and the outer surface of the knob 44 have raised ridges and/or cutouts to provide texture and grip for the user. Thus, the user can more easily turn the knob 44 and/or the funnel 48 if the funnel 48 is rotatable relative to the body portion 46 and/or knob 44. The outer surface of the body portion 46 is smooth to enable easy storage in a user's pocket or bag.

Figure 6:
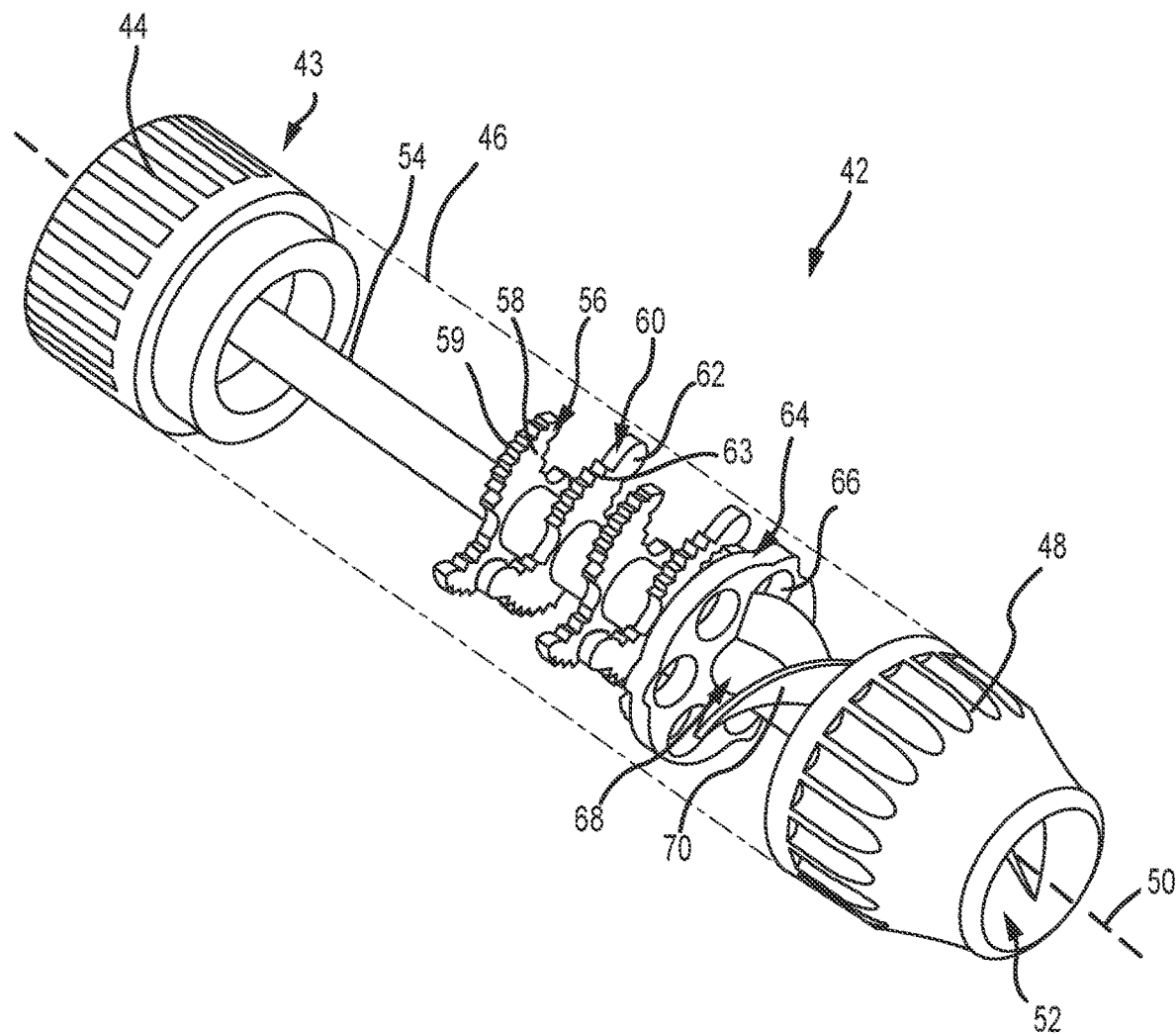
FIG. 6 is a perspective view of the grinder in FIG. 5 with the body shown in phantom in accordance with an embodiment of the present disclosure.

FIG. 6 is a perspective view of the grinder 42 with the body 46 shown in phantom. A shaft 54 descends from the knob 44, and a series of first blades 56 and second blades 60 extend outward from the shaft 54. The first blade 56 has three arms 58, each with a plurality of teeth 59. Similarly, the second blade 60 has three arms 62, each with a plurality of teeth 63, and the second blade 60 is offset in an angular direction about the shaft 54 relative to the first blade 56. The first and second blades 56, 60 are also shaped differently with the overall size being different and the end of the arms 58, 62 having different shapes. The grinder 42 in FIG. 6 has multiple first blades 56 and multiple second blades 60, which alternate along the shaft 54. It will be appreciated that the present disclosure encompasses embodiments of the grinder 42 with any number and configuration of blades. For instance, the grinder 42 may have one, two, three, four, etc. first blades 56. Further, the grinder 42 may have one, two, three, four, etc. second blades 60.

Moreover, each blade may have any number of arms. The first blade 56 in FIG. 6 has three arms 58 evenly arrayed around the shaft 54. It will be appreciated that the present disclosure encompasses embodiments of the grinder 42 with a first blade 56 that has one, two, four, etc. arms 58. In some embodiments, the first blade 56 may not comprise an arm 58 at all. In addition, each arm 58, optionally, may comprise teeth 59. However, in some embodiments, the arm 58 has a bladed edge rather than any teeth 59. Further still, the first blade 56 and the second blade 60 may have different sizes, shapes, configurations, etc.

Similarly, the second blade 60 in FIG. 6 has three arms 58 evenly arrayed around the shaft 54. It will be appreciated that the present disclosure encompasses embodiments of the grinder 42 with a second blade 60 that has one, two, four, etc. arms 62. In some embodiments, the second blade 60 may not comprise an arm 62 at all. In addition, each arm 62, optionally, may comprise teeth 63. However, in some embodiments, the arm 62 has a bladed edge rather than any teeth 63.

During operation, a user may grasp and rotate the knob 44, which then turns the shaft 54 and blades 56, 60 to grind contents within the grinder 42. The body of the grinder 42 may have internal features such as complementary blades that act in concert with the blades 56, 60 when the user turns the knob 44, as described herein and shown in FIG. 2.

When the contents are ground into smaller pieces, the pieces fall through apertures 66 of a divider 64, which is located at one end of the blades 56, 60 and proximate the funnel 48. The divider 64 acts as a screen, and the apertures 66 are sized to allow sufficiently small pieces of the ground contents to pass through and toward the bottom opening 52 and to block pieces that are too large such that they can be further ground. These large pieces may continue to be ground by the blades 56, 60 to reduce the pieces of contents to a sufficiently small size to pass through the apertures 66. While FIG. 6 depicts six apertures 66 evenly spaced around the axis 50 of the grinder 42 and center of the divider 64, the present disclosure encompasses a variety of embodiments of apertures 66. In some embodiments, the divider 64 has fewer or more than six apertures 66. In various embodiments, the apertures 66 have a non-circular shape and/or a different size. The divider may be removable and changeable such that different dividers with differently sized apertures can be used depending on the desired size of the ground contents.

An auger 68 is positioned below the divider 64 to transfer small pieces of the contents from the divider 64 to the bottom opening 52 and out of the grinder 42. The auger 68 is oriented along the axis 50 of the grinder 42, and the auger 68 may have a shaft (72 in FIG. 7) that extends through the divider 64 and is operably engaged with an end of the shaft 54 of the rotor. Thus, as a user turns the knob 44 and shaft 54 of the rotor, the auger 68 turns blades 70 that direct small pieces of contents out of the bottom opening 52. Each blade 70 extends along and twists about the shaft (72 in FIG. 7). In some embodiments, the auger 68 rotates separately from the knob 44 and shaft 54 of the rotor. Thus, the cutouts or indentations on the outer portion of the funnel 48 permit the user to rotate the funnel 48, which rotates the auger 68, auger shaft 72, and auger blades 70. If the auger 68 rotates separately from the rotor shaft 54, then the ground contents may remain in the bottom portion of the grinder 42 until the user rotates the funnel 48 and auger 68, at which point the contents exit the funnel 48 and opening 52 because the contents are pushed out by the blades 70.

Figure 7:
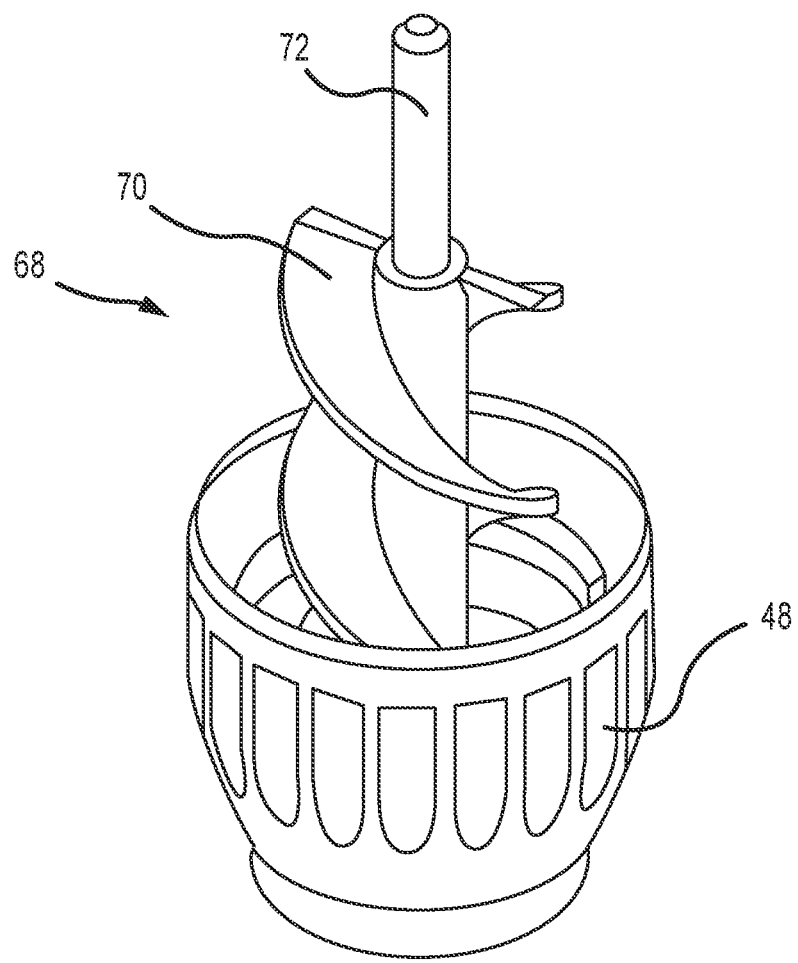
FIG. 7 is a perspective view of the auger in FIG. 6 in accordance with an embodiment of the present disclosure.

FIG. 7 is a perspective view of the auger 68. In this embodiment, the shaft 72 of the auger 68 extends upward to operably engage the shaft of the rotor (54 in FIG. 6). The auger shaft 72 may rotate with the rotor shaft 54 or may rotate independently. The auger 68 comprises two blades 70 symmetrically twisting about the shaft 72. However, it will be appreciated that the present disclosure encompasses embodiments with one, two, three, etc. blades 70. The blades 70 of the auger 68 also help the small pieces of the contents exit the grinder 42 in a predictable fashion. Without the blades 70, the small pieces may simply fall out of the grinder 42 once the small pieces pass the divider. However, in this embodiment, the small pieces may contact the blades 70 of the auger 68, and small pieces may exit the grinder 42 in an appreciable amount when the user is turning the knob 44. Thus, dispensing the contents out of the grinder 42 is more predictable with the auger 68.

Figure 8:
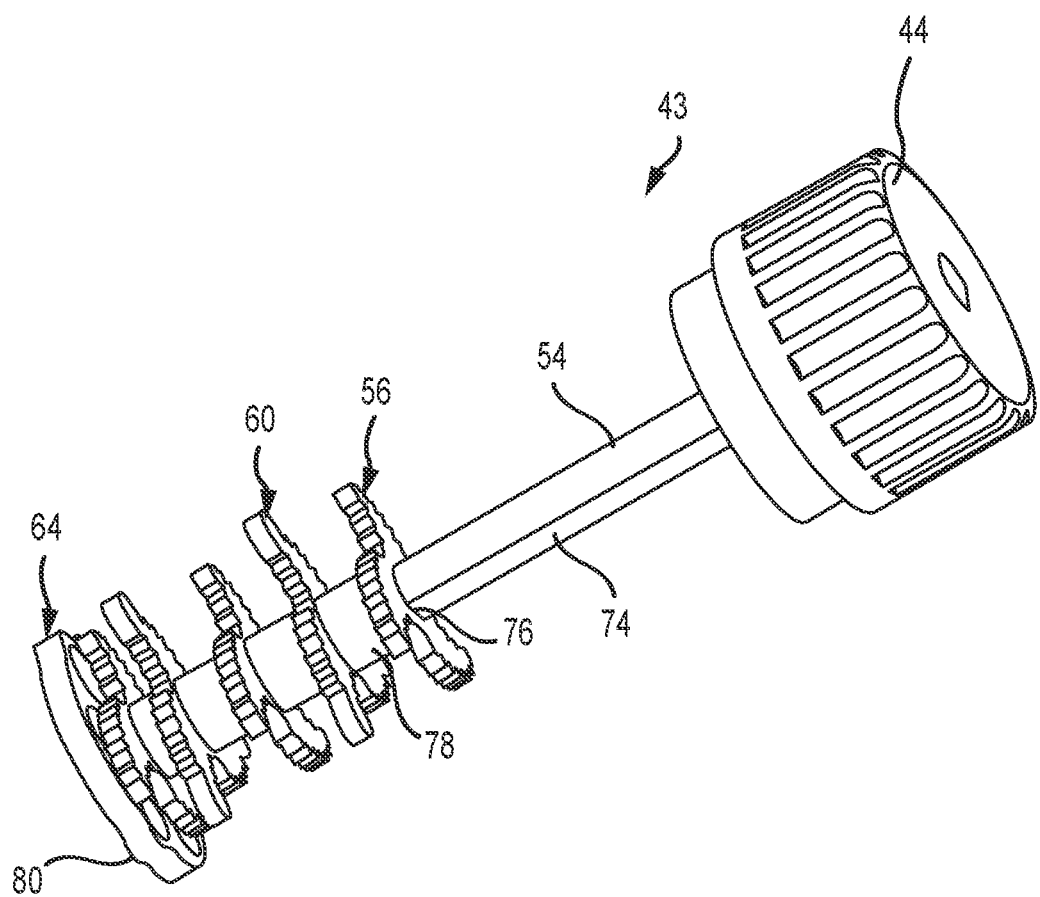
FIG. 8 is a further perspective view of the knob, shaft, and blades of the grinder in FIG. 6 in accordance with an embodiment of the present disclosure.

FIG. 8 is a perspective view of the knob 44, the shaft 54, the blades 56, 60, and the divider 64. One side of the shaft 54 of the rotor has a flat, notched portion 74. The first blade 56, as well as the other blades 60, can have a corresponding notch 76 in an aperture through which the shaft 54 extends. Thus, the rotational motion of the shaft 54 is translated to the blades 56, 60 because the aligned notched portion 74 and notch 76 rotate the blades 56, 60 together with the shaft 54. The blades 56, 60 can be separated by optional spacers 78 that are disposed about the shaft 54 and positioned between the blades 56, 60. Finally, the divider 64 may have an outwardly extending projection 80 that engages part of the inner surface of the body of the housing (46 in FIG. 5) to prevent the divider 64 from rotating during operation of the grinder 42.

The size and shape of the grinder 41,42 is important. It should be sized and shaped to fit in a user's pocket such that it is portable. Therefore, it must be small and compact. For example, it should be 8 inches long or smaller with a maximum outer diameter of 2 inches. In preferred embodiments, the grinder is about 6 inches long (or smaller) with a maximum outer diameter of 1 inch. As such, the outer diameter of the grinder is 25% or less of the length of the grinder.

It should be understood that the drawings are not necessarily to scale, and various dimensions may be altered. In certain instances, details that are not necessary for an understanding of the invention or that render other details difficult to perceive may have been omitted. It should be understood, of course, that the invention is not necessarily limited to the particular embodiments illustrated herein.

Additionally, various features/components of one embodiment may be combined with features/components of another embodiment. For example, features/components of one figure can be combined with features/components of another figure or features/components of multiple figures. To avoid repetition, every different combination of features has not been described herein, but the different combinations are within the scope of this disclosure. Additionally, if details (including angles, dimensions, etc.) about a feature or component are described with one embodiment or one figure, then those details can apply to similar features of components in other embodiments or other figures.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein is capable of other embodiments and of being practiced or of being carried out in various ways. It is to be understood that the phraseology and terminology used herein is for the purpose of description and should not be regarded as limiting.

It is to be appreciated that any feature described herein can be claimed in combination with any other feature(s) as described herein, regardless of whether the features come from the same described embodiment.

What is claimed is:

1. A handheld grinder, comprising:
   a housing having a cylindrical body portion, a top end, and a funnel portion opposite the top end and connected to the cylindrical body portion, wherein the funnel portion tapers inwardly from the body portion to a lower end with a bottom opening, wherein the housing has an interior space between the top end and the bottom opening that is configured to receive a material;
   a rotor having a shaft extending into the interior space of the housing and having a plurality of rotor blades extending from the shaft, wherein the shaft is configured to rotate relative to the housing, and wherein a longitudinal axis of the shaft of the rotor is aligned with a longitudinal axis of the housing, wherein the handheld grinder is sized to fit into a user's pocket; and
   an auger having a shaft operably engaged with the shaft of the rotor, the auger having at least one blade twisting about the shaft of the auger, wherein the rotor is configured to rotate relative to the housing such that the plurality of rotor blades grind the material into smaller pieces, wherein the auger is configured to rotate with the rotor such that the at least one blade of the auger transfers smaller pieces of the material out of the bottom opening.

2. The handheld grinder of claim 1, wherein the handheld grinder does not comprise electrical components.

3. The handheld grinder of claim 1, further comprising:
   a divider spanning the interior space of the housing and positioned between the plurality of rotor blades and the auger, wherein the divider comprises an aperture configured to allow only sufficiently small material to pass through the divider to the auger.

4. The handheld grinder of claim 1, wherein a rotor blade of the plurality of rotor blades comprises three arms evenly arrayed about the longitudinal axis of the shaft of the rotor.

5. The handheld grinder of claim 4, wherein each arm comprises a plurality of teeth.

6. The handheld grinder of claim 4, wherein a second rotor blade of the plurality of rotor blades comprises three arms evenly arrayed about the longitudinal axis of the shaft of the rotor, and a rotational position of the rotor blade is offset from a rotational position of the second rotor blade.

7. The handheld grinder of claim 1, wherein the at least one blade of the auger is two blades symmetrically arranged about the shaft of the auger.

8. The handheld grinder of claim 1, further comprising:
   a plurality of housing blades extending from an inner surface of the housing, wherein the rotor is configured to rotate relative to the housing such that the plurality of rotor blades and the plurality of housing blades grind the material into smaller pieces.

9. The handheld grinder of claim 8, wherein a rotor blade of the plurality of rotor blades is configured to pass between adjacent housing blades of the plurality of housing blades as the rotor rotates relative to the housing.

10. The handheld grinder of claim 8, wherein each housing blade has an angular position about the longitudinal axis of the housing that is offset from an angular position of an adjacent housing blade.

11. The handheld grinder of claim 10, wherein the angular position of each housing blade is offset by 90 degrees from the angular position of the adjacent housing blade.

12. The handheld grinder of claim 1, wherein the shaft of the rotor extends from a knob.

13. A handheld grinder, comprising:
    a housing having a cylindrical body portion, a top end, and a funnel portion opposite the top end and connected to the cylindrical body portion, wherein the funnel portion tapers inwardly from the body portion to a lower end with a bottom opening, wherein the housing has an interior space between the top end and the bottom opening that is configured to receive a material;
    a rotor having a shaft extending into the interior space of the housing and having a plurality of rotor blades extending from the shaft, wherein the shaft is configured to rotate relative to the housing, and wherein a longitudinal axis of the shaft of the rotor is aligned with a longitudinal axis of the housing, wherein the handheld grinder is sized to fit into a user's pocket; and
    an auger having a shaft operably engaged with the shaft of the rotor, the auger having at least one blade twisting about the shaft of the auger, wherein the rotor is configured to rotate relative to the housing such that the plurality of rotor blades grind the material into smaller pieces, wherein the auger is configured to rotate independently of the rotor such that the at least one blade of the auger transfers smaller pieces of the material out of the bottom opening.

14. A handheld grinder, comprising:
    a housing having a cylindrical body portion, a top end, and a funnel portion opposite the top end and connected to the cylindrical body portion, wherein the funnel portion tapers inwardly from the body portion to a lower end with a bottom opening, wherein the housing has an interior space between the top end and the bottom opening that is configured to receive a material;
    a rotor having a shaft extending into the interior space of the housing and having a plurality of rotor blades extending from the shaft, wherein the shaft is configured to rotate relative to the housing, and wherein a longitudinal axis of the shaft of the rotor is aligned with a longitudinal axis of the housing, wherein the handheld grinder is sized to fit into a user's pocket;
    an auger having a shaft operably engaged with the shaft of the rotor, the auger having at least one blade twisting about the shaft of the auger, wherein the rotor is configured to rotate relative to the housing such that the plurality of rotor blades grind the material into smaller pieces; and
    a divider spanning the interior space of the housing and positioned between the plurality of rotor blades and the auger, wherein the divider comprises an aperture configured to allow only sufficiently small material to pass through the divider to the auger.

\* \* \* \* \*